UNITED STATES PATENT OFFICE.

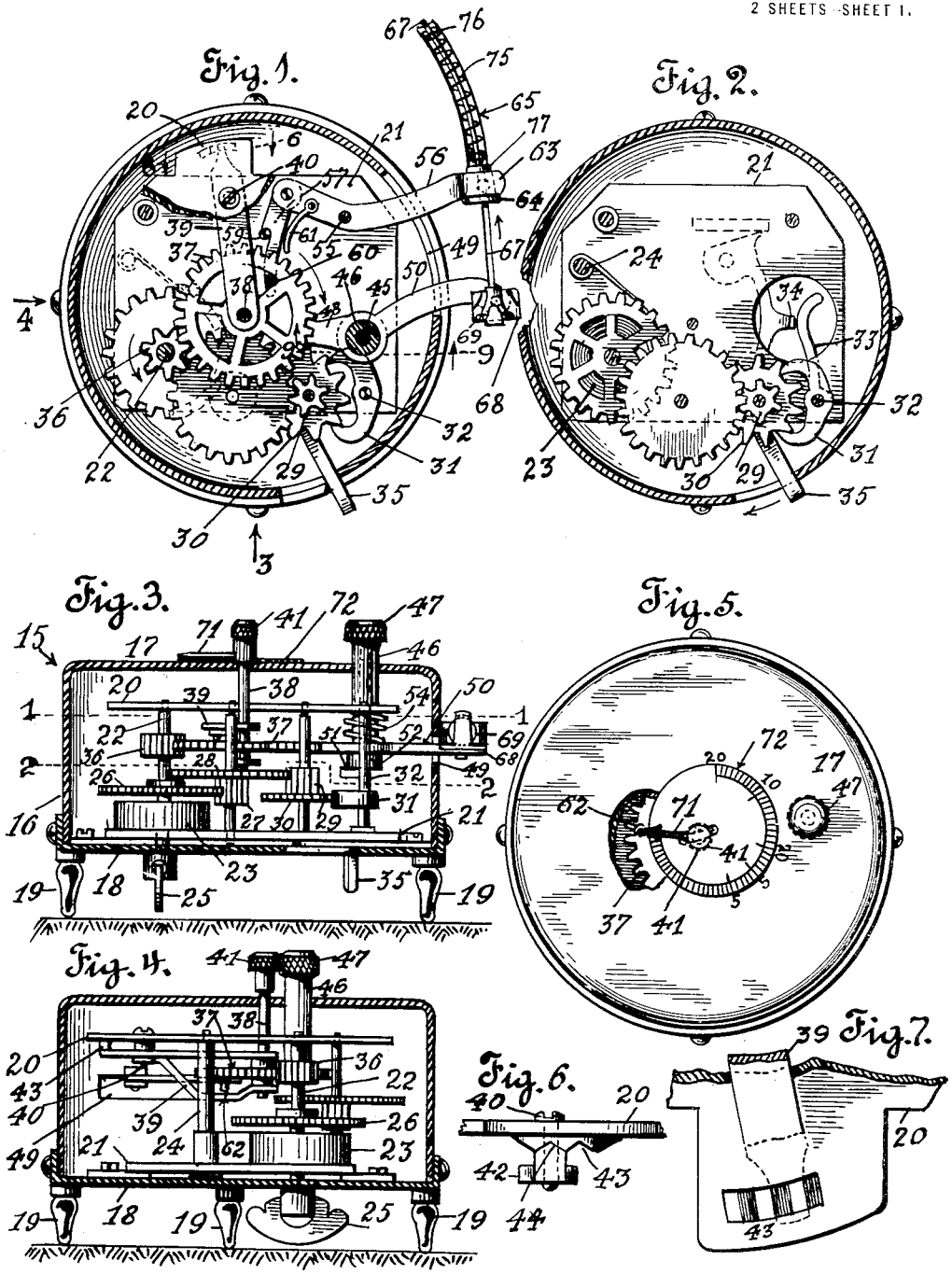

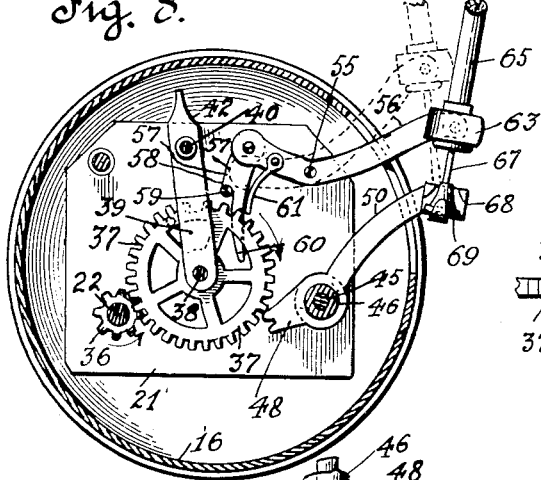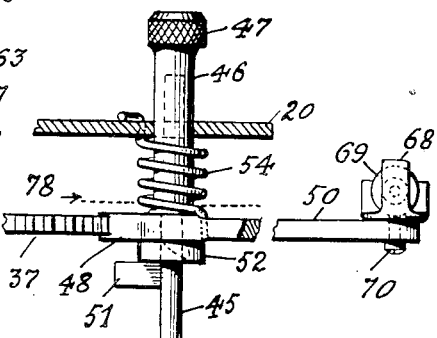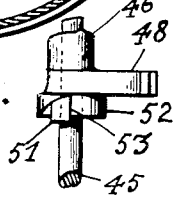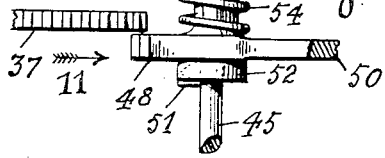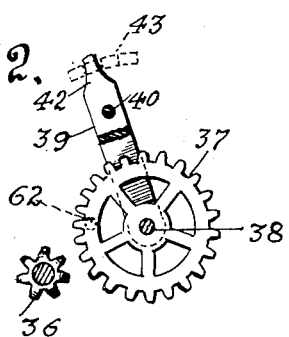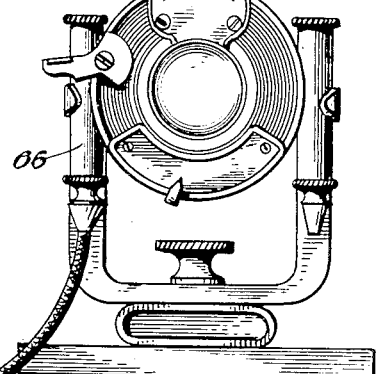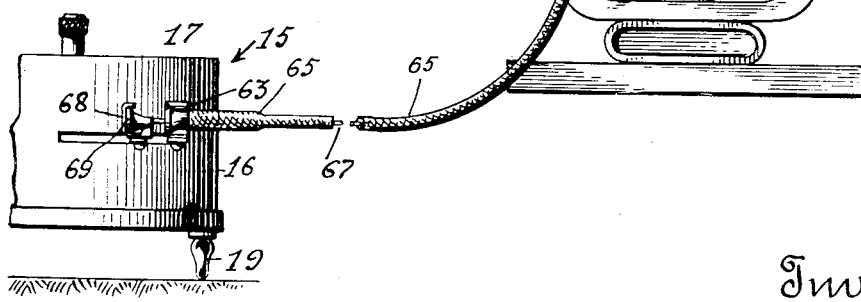

HOWARD ZELLERS, OF TAFT, CALIFORNIA.

TIME-OPERATOR FOR CAMERAS.

1,175,398.  Specification of Letters Patent.  Patented Mar. 14, 1916.

Application filed April 21, 1915. Serial No. 22,739.

*To all whom it may concern:*

Be it known that I, HOWARD ZELLERS, a citizen of the United States, residing at Taft, in the county of Kern and State of California, have invented new and useful Improvements in Time-Operators for Cameras, of which the following is a specification.

This invention relates to a camera operating mechanism.

It is the purpose of this invention to provide a device for automatically operating the shutter of a camera by which the shutter may be opened and maintained in an open position in taking time-exposure photographs or operated to take snap-shots or instantaneous exposures.

It is the object of this invention to provide a mechanism of the above character which can be connected to most cameras of the kodak type without any alteration in the construction thereof, at any time its use is required, by which the shutter of the camera may be automatically operated after a lapse of time so that a person after focusing and adjusting the camera may step into the range of the lens before the shutter is operated.

Another object is to provide a camera actuating mechanism which is controlled by an ordinary clock-work and which embodies means for depressing a shutter opening device attached to a camera, and means adapted to be operated at various predetermined times for releasing the shutter opening device.

A further object is to provide a simple and novel means for adjusting the time controlled mechanism.

In the ordinary cameras of the kodak type the shutter is operated by means of a flexible rod incased in a flexible tube and connected at one end to the shutter operating mechanism and provided with a head or push button on its outer end; the button being depressed to open the shutter and released so that it may be retracted automatically to close the shutter.

In carrying out the present invention I provide an attachment to the camera adapted to be connected to the push button and to the flexible casing of the operating rod connected thereto whereby the rod may be automatically depressed and maintained in such position to hold the camera shutter open and with means whereby after the lapse of a predetermined time the rod will be retracted in relation to the camera shutter though held against movement in relation to the attachment.

The invention is illustrated in the accompanying drawings in which:

Figure 1 is a horizontal sectional view of the invention as seen on the line 1—1 of Fig. 3 showing the parts in their normal position and as attached to the shutter operating device of a camera. Fig. 2 is a similar view on the line 2—2 of Fig. 3. Fig. 3 is a view in vertical section and side elevation as seen in the direction indicated by the arrow 3 in Fig. 1. Fig. 4 is a view in section and elevation as seen in the direction indicated by the arrow 4 in Fig. 1. Fig. 5 is a plan view of the device with parts broken away. Fig. 6 is a detail section and elevation on the line 6—6 of Fig. 1 as seen in the direction indicated by the arrows, illustrating the latch for locking a pivoted gear carrying arm. Fig. 7 is an inverted plan view of the device shown in Fig. 6. Fig. 8 is a view similar to Fig. 1 with parts removed and showing the parts in an intermediate position in full lines when the camera shutter is open and indicating the position of the shutter releasing mechanism in dotted lines. Fig. 9 is an enlarged detail section and elevation on the line 9—9 of Fig. 1 as seen in the direction indicated by the arrows, showing the mechanism for automatically throwing out the shutter actuating gear. Fig. 10 is a detail of same showing the gear in its thrown out position. Fig. 11 is a view in elevation as seen in the direction indicated by the arrow 11 of Fig. 10. Fig. 12 is a detail in plan view illustrating the time actuating gear as disposed in an inoperative position for adjustment to operate at any desired interval. Fig. 13 is a detail in front elevation of the lens portion of a camera illustrating the invention as applied.

More specifically, 15 indicates the casing of the mechanism which is here shown as comprising a cylindrical side wall 16 closed at one end by a top plate 17 and closed at its other end by a demountable bottom plate 18; legs 19 being mounted on the casing 15 by which it may be supported on a flat surface with the bottom plate 18 spaced thereabove.

Mounted within the casing 15 is a pair of horizontally disposed spaced plates 20 and 21 carrying a clock mechanism and the actuating mechanism controlled thereby. The clock mechanism comprises a drive shaft 22 fitted with a clock spring 23 one end of which is attached to the drive shaft 22 and the opposite end connected to a post 24. The drive shaft 22 extends through the plate 21 and bottom plate 18 and is fitted with a stem 25 by means of which it may be rotated to wind the spring 23 in the usual manner. A toothed wheel 26 is mounted on the shaft 22 and meshes with a pinion 27 on a toothed wheel 28 engaging a pinion 29 on an escapement wheel 30 normally engaged by an escapement pawl 31 on a shaft 32 as is common in clock construction. The shaft 32 is provided with an arm 33 which is normally engaged by a projection 34 on a pivoted arm 35 to hold the escapement against movement and lock the shaft 22 against rotation; the arm 35 being rocked to release the escapement when it is desired to set the drive shaft 22 in operation. The foregoing mechanism is similar to that of the ordinary alarm clock and constitutes the time controlled motive power of the invention.

Mounted on the drive shaft 22 is a pinion 36 adapted to mesh with a toothed wheel 37 mounted on the shaft 38 carried by a forked arm 39 pivoted at 40 to the plate 20. The shaft 38 extends through arcuate slots in the plates 20 and 17 and is provided with a knurled head 41 on its upper ends by means of which the arm 39 may be rocked on its pivot 40 to throw the toothed wheel 37 in and out of mesh with the pinion 36; the knurled head 41 also serving as a means by which the toothed wheel 37 may be rotated when out of mesh with the pinion 36 to dispose it in any desired position so that the toothed wheel 37 may be meshed with the pinion 36 at any point throughout its periphery. The arm 39 is extended beyond its pivot 40 and is formed with a spring tongue 42 which normally extends into engagement with either of a pair of notches 43 and 44 formed on a rib carried on the under side of the plate 20; the engagement of the tongue 42 and the notches 43 or 44 serving to hold the arm 39 against movement to retain the toothed wheel 37 in or out of mesh with the pinion 36. The notches 43 and 44 have inclined side walls so that the spring tongue 42 may readily ride in and out of engagement with the notches on rocking the arm 39.

Mounted on the plate 21 is an upwardly extending post 45 on which a sleeve 46 is revolubly and reciprocally mounted; the sleeve 46 extending upwardly through the plate 20 and top plate 17 as particularly shown in Fig. 3 and fitted with a knurled head 47 on its upper end by means of which it may be rotated and shifted longitudinally. Rigidly mounted on the sleeve 46 is a toothed segment 48 which is adapted to be thrown in and out of mesh with the toothed wheel 37 and affixed to the sleeve 46 and projecting through a peripheral slot 49 in the cylindrical wall 16 is an arm 50. Projecting from the post 45 is a stud 51 on which a collar 52 formed on the lower end of the sleeve 46 is adapted to rest; the stud 51 serving to limit the downward movement of the sleeve 46 and also forming a stop to limit the rotation of the sleeve 46 in one direction; the collar 52 being formed with a cut-away portion terminating in a shoulder 53 which is adapted to engage the stud 51 as shown in Fig. 11. A spiral spring 54 is wound around the sleeve 46 and has one end affixed to the arm 50 and the opposite end attached to the plate 20; the spring 54 serving to exert a downward pressure to maintain the collar 52 in contact with the stud 51 and to force the sleeve 46 downwardly when the notch and shoulder 53 is positioned opposite the stud 51 and also operating to exert a rotary pull on the sleeve 46 opposing advanced movement of the segment 48 and operating to hold the shoulder 53 in engagement with the stud 51. Pivoted at 55 on the under side of the plate 20 is an arm 56 which extends outwardly through the slot 49 with its outer terminal spaced from the outer end of the arm 50. The inner end of the arm 56 extends beyond the pivot 55 and is fitted with a pawl 57 having a shoulder 58 thereon adapted to engage a post 59 to normally limit the movement of the arm 56 in one direction; the pawl 57 being extended beyond the shoulder 58 to form a finger 60 which extends beneath the toothed wheel 37 adjacent thereto. A spring 61 on the arm 56 operates to normally maintain the pawl 57 in engagement with the post 59.

Mounted on the under side of the toothed wheel 37 is a pin 62 which is adapted on rotation of the wheel 37 to engage the finger 60 on the pawl 57 to rock the latter in opposition to the spring 61 to disengage it from the post 59 and thereby release the arm 56.

Mounted on the outer end of the arm 56 is a U-shaped spring clip 63 which is arranged with its limbs extending parallel with the arm 56 and is pivotally connected to the latter so as to have a turnable movement in relation to the arm 56. This clip 63 is provided as a means for engaging a flanged collar 64 formed on the outer end of a flexible tube 65 connecting with the cylinder 66 and containing a flexible rod 67 connecting with the shutter operating parts of the camera arranged in the cylinder 66 in the usual manner.

A clip 68 is mounted on the outer end of the arm 50 and is adapted to engage a head 69 on the rod 67; the clip 68 being pivotally connected to the arm 50 by means of a pivot pin 70 as shown in Fig. 9. The pivotal mountings of the clips 63 and 68 permit movement of the arms 50 and 56 independent of each other; the flexibility of the tube 65 allowing the same to be swung from side to side when the arms 50 and 56 are operated.

In the operation of the invention the clips 63 and 68 are attached to the collar 64 and head 69, respectively, of the shutter operating device as particularly shown in Fig. 1; the mechanism being previously set with the parts disposed as shown in Fig. 1, that is with the teeth of the toothed segment 48 meshing with the toothed wheel 37, with the arm 50 disposed in its rearmost position, and the arm 56 arranged in its forward position with the pawl 57 engaging the stud 59. The adjustment of the arm 50 is effected by lifting the sleeve 46 upwardly in opposition to the spring 54 to dispose the toothed segment 48 above the toothed wheel 37 and out of mesh therewith. The arm 56 is adjusted by advancing the outer end thereof to retract the pawl 57. When it is desired that the shutter operating rod 67 be maintained in its depressed position for a period of time when the mechanism is in operation, the toothed wheel 37 is set so that the pin 62 will strike the finger on the pawl 57 to disengage the latter at a predetermined time. This setting of the wheel 37 is effected by rocking the arm 39 by means of the head 41 to throw the toothed wheel 37 out of mesh with the pinion 36, this being effected when the toothed segment 48 is disposed out of mesh with the wheel 37. The toothed wheel 37 is then turned by the head 41 to dispose the pin 62 at a suitable point remote from the pawl 57. As a means for determining the position of the pin 62 an indicating arrow 71 is mounted on the stem 38 and extends adjacent the upper face of the top plate 17 above a graduated segment 72 arranged to be disposed concentric with the shaft 38 when the latter is moved with the arm 39 into the position wherein the toothed wheel 37 is out of mesh with the pinion 36. The graduations in the segment 72 are spaced and indicated according to the length of time required for the movement of the pin 62 along its path of travel; the speed of the toothed wheel 37 carrying the pin 62 being regulated by its geared connections with the driving spring 23 and may be constructed to operate at any desired speed.

After the time controlling toothed wheel 37 has been set in the desired position and reëngaged with the pinion 36 and the arms 50 and 56 positioned as shown in Fig. 1 the clock work is set in operation by operating the escapement releasing arm 35. When this is done the spring 23 operates to rotate the shaft 22, thereby driving the toothed wheel 37 through the pinion 36. The toothed wheel 37 in rotating, advances the pin 62 toward the pawl 57 and also rocks the arm 50 toward the arm 56 through the medium of the toothed segment 48; the parts moving in the directions indicated by the arrows in Fig. 1. The movement of the arm 50 advances the rod 67 until the toothed segment 48 is moved out of mesh with the toothed wheel 37 into the position shown in Fig. 8. The moment the toothed segment 48 is out of mesh with the toothed wheel 37 the spring 54 will operate to move the shoulder 53 into engagement with the stud 51 on the standard 45 so as to lock the arm 50 against rearward movement. The rod 67 will then be advanced sufficiently far to operate the lens shutter of the camera.

The rotation of the wheel 37 is so timed that the advanced movement of the arm 50 to operate the camera shutter will be sufficiently slow to permit the person adjusting the device to take a position thereafter within the range of the camera lens.

The time of opening of the lens shutter may be regulated by the usual adjustment device on the camera so as to take an instantaneous exposure or time-exposures of different durations. If the camera is set to take an instantaneous exposure the depression of the rod 67 will operate to both open and close the shutter; the shutter being automatically closed by the usual mechanism. However if it is desired to take a time-exposure of considerable length of duration the shutter timing mechanism indicated at 74 in Fig. 13 is adjusted accordingly. The closing of the shutter will then be effected by retractive movement of the rod 67 in relation to its casing 65 which is effected when the pawl 57 is thrown out of engagement with the post 59 by the pin 62 engaging the pawl; a spring 75 arranged in the casing 65 and bearing between a collar 76 in the casing 65 and the collar 77 on the rod 67 operating to advance the casing 65 and to rock the arm 66 from the position shown in full lines in Fig. 8 into the position indicated in dotted lines therein. After this operation has been completed the device may be reset into the position shown in Fig. 1 by lifting the segment 48 to a point above the toothed wheel 37 into the position indicated by the dotted lines 78 in Fig. 9, re-adjusting the toothed wheel 37 and re-setting the arm 56 as before described.

It is manifest that various changes in arrangement and construction of the parts may be resorted to within the spirit and scope of the appended claims.

What I claim is:

1. The combination with a camera shutter and a depressible member for actuating same, of a clock mechanism, means controlled by said clock mechanism for slowly advancing the depressible member, and means operable by the clock-work at a predetermined time after said member has been depressed to retract same in relation to the camera shutter.

2. The combination with a camera shutter and a depressible member for actuating same, of a clock mechanism, a pivoted arm connected to the depressible member, means for slowly rocking said arm by the clockwork to advance the depressible member, and means controlled by the clock-work for retracting the depressible member in relation to the camera shutter at a predetermined interval of time.

3. The combination with a camera shutter and a depressible member for actuating same, of a clock mechanism, an arm connected to the depressible member, a toothed wheel adapted to be rotated by the clock mechanism, means on said arm engageable with the toothed wheel, whereby the arm and the depressible member may be advanced by the rotation of said toothed wheel, and means controlled by the clockwork for retracting the depressible member in relation to the camera shutter at a predetermined interval of time.

4. The combination with a camera shutter and a depressible member for actuating same, of a clock mechanism, a pivoted arm connected to the depressible member, means for slowly advancing said arm controlled by the clock mechanism, means for automatically locking said arm in an advanced position, and means controlled by the clockwork for retracting the depressed member at a predetermined time.

5. The combination with a camera shutter and a depressible member for actuating same, of a clock mechanism, a pivoted arm connected to the depressible member, means for slowly advancing said arm controlled by the clock mechanism, means for automatically locking said arm in an advanced position, and means controlled by the clockwork for retracting the depressed member at a predetermined time, without retraction of the pivoted arm.

6. In a time operating device, a pair of pivoted arms, a fixed pin, a pawl on one of said arms engageable with the pin by which said arm is held against advanced movement, a clock mechanism, means controlled by said clock mechanism for advancing the other arm in relation to the locked arm, and means controlled by said clock mechanism engageable with the pawl for releasing the locked arm to permit its being moved away from the previously advanced arm.

7. In a time operating device, a clock mechanism, a wheel rotated thereby, a pivoted arm, means for advancing said arm by said wheel, means for locking the arm in its advanced position, a second arm, means for locking said arm against advanced movement, and means for releasing said arm after the first-named arm has been advanced to permit advance movement thereof.

8. In a time operating device, a clock mechanism, a wheel rotated thereby, a pivoted arm, means for advancing said arm by said wheel, means for locking the arm in its advanced position, a second arm, means for locking said arm against advanced movement, and means for releasing said arm at predetermined intervals after the first-named arm has been advanced.

9. In a time operating device, a clock mechanism, a driving pinion rotated thereby, a toothed wheel adapted to be thrown in and out of mesh with said pinion, a toothed segment adapted to be thrown in and out of mesh with said toothed wheel, an arm connected to said toothed segment adapted to be advanced by the action of the toothed wheel on the toothed segment, means for automatically locking the arm in its advanced position with the segment out of mesh with the toothed wheel, a second arm, means for locking said arm against advanced movement, and means on said toothed wheel for releasing said second arm.

10. In a time operating device, a clock mechanism, a driving pinion rotated thereby, a toothed wheel adapted to be thrown in and out of mesh with said pinion, a toothed segment adapted to be thrown in and out of mesh with said toothed wheel, an arm connected to said toothed segment adapted to be advanced by the action of the toothed wheel on the toothed segment, a fixed stud, a second arm, means coöperating with said stud for locking said second arm against advance movement, and means on said toothed wheel for releasing said second arm.

11. In a time operating device, a clock mechanism, a driving pinion rotated thereby, a toothed wheel adapted to be thrown in and out of mesh with said pinion, a toothed segment adapted to be thrown in and out of mesh with said toothed wheel, an arm connected to said toothed segment adapted to be advanced by the action of the toothed wheel on the toothed segment, a fixed stud, a second arm, a pawl on said second arm engageable with said stud to lock the arm against advance movement, and means on said toothed wheel engageable with said pawl to release said second arm.

12. In a time operating device, a clock mechanism, a driving pinion rotated thereby, a toothed wheel adapted to be thrown in and out of mesh with said pinion, a toothed segment adapted to be thrown in and out of mesh with said toothed wheel, an arm connected to said toothed segment adapted to be advanced by the action of the toothed wheel on the toothed segment, a fixed stud, a second arm, a pawl on said second arm engageable with said stud to lock the arm against advance movement, and a pin on said toothed wheel adapted to engage the pawl to release said second arm.

13. In a time operating device, a clock mechanism, a driving pinion rotated thereby, a toothed wheel adapted to be thrown in and out of mesh with said pinion, a toothed segment adapted to be thrown in and out of mesh with said toothed wheel, an arm connected to said toothed segment adapted to be advanced by the action of the toothed wheel on the toothed segment, a fixed stud, a second arm, a pawl on said second arm engageable with said stud to lock the arm against movement, a pin on said toothed wheel adapted to engage the pawl to release said second arm, and means for adjusting the toothed wheel to vary the position of the pin relative to the pawl.

14. In a time operating device, a clock mechanism, a driving pinion rotated thereby, a toothed wheel adapted to be thrown in and out of mesh with said pinion, a toothed segment adapted to be thrown in and out of mesh with said toothed wheel, an arm connected to said toothed segment adapted to be advanced by the action of the toothed wheel on the toothed segment, means for automatically locking the arm in its advanced position with the segment out of mesh with the toothed wheel, a second arm, means for locking said arm against advanced movement, means on said toothed wheel for releasing said second arm, and means for adjusting said toothed wheel whereby the second arm may be released at a predetermined interval.

In witness that I claim the foregoing I have hereunto subscribed my name this 3rd day of April, 1915.

HOWARD ZELLERS.

Copies of this patent may be obtained for five cents each, by addressing the "Commissioner of Patents, Washington, D. C."